United States Patent [19]

Froberg

[11] 4,362,543
[45] Dec. 7, 1982

[54] METHOD FOR CONTROLLING PARTICULATE EMISSIONS

[75] Inventor: Magnus L. Froberg, Granville, Ohio

[73] Assignee: Owens-Corning Fiberglas Corporation, Toledo, Ohio

[21] Appl. No.: 245,831

[22] Filed: Mar. 19, 1981

[51] Int. Cl.³ ............................ C03C 1/00; C03B 3/00
[52] U.S. Cl. ............................................ 65/27; 65/2; 65/134; 65/335
[58] Field of Search ................. 65/27, 134, 335, 2

[56] References Cited

U.S. PATENT DOCUMENTS

| | | | |
|---|---|---|---|
| 4,208,201 | 6/1980 | Rueck | 65/27 |
| 4,235,618 | 11/1980 | Henry et al. | 65/27 X |
| 4,282,019 | 8/1981 | Dunn et al. | 65/335 X |

FOREIGN PATENT DOCUMENTS

| | | | |
|---|---|---|---|
| 275078 | 10/1969 | Austria | 65/335 |
| 50-55610 | 5/1975 | Japan | 65/27 |

OTHER PUBLICATIONS

"Proceedings of the 41st Conference on Glass Problems," Ohio State Ceramic Engr. Dept., ISS. ND 196-6219 ACS, 11/80.

Primary Examiner—Robert L. Lindsay, Jr.
Attorney, Agent, or Firm—Ronald C. Hudgens; Patrick P. Pacella

[57] ABSTRACT

A process for the manufacture of glass is disclosed. Glass batch agglomerates are formed, fed to a vertical bed preheat hopper, dried and preheated with furnace exhaust gases, and then fed to a glass melting furnace. The spent exhaust gases are electrically charged and passed through an electrified bed of granules to remove glass batch particulate from the spent gases.

4 Claims, 2 Drawing Figures

METHOD FOR CONTROLLING PARTICULATE EMISSIONS

TECHNICAL FIELD

This invention relates to a process for reducing the particulate emissions in the exhaust gas from a glass melting furnace.

BACKGROUND ART

Methods are known in the art for glass manufacturing wherein glass-forming, batch ingredients are compacted into agglomerates and then are dried and heated in a chamber by a direct contact with flue gases from a glass melting furnace so as to produce free-flowing agglomerates which are then conveyed and discharged to the glass melting furnace. These agglomerates are composite, integral, self-supporting masses consisting essentially of all the substantial batch materials and may take the form of balls, extrusions, discs, briquettes, and pellets. The agglomerates are discharged to a vertical bed contained within a chamber and furnace flue gases pass, in direct contact with and countercurrently to, downwardly moving pellets of the bed to preheat them.

One method known in the art to form the agglomerates is to combine the glass forming batch ingredients with water. In the context of drying and heating water-containing, glass batch agglomerates with flue gases from a fossil fuel fired melting furnace, the most desirable process equipment of the prior art is a shaft type heater, or chamber, i.e., a vertical bed of substantial height, and preferably a bed in which the agglomerates flow downwardly through the chamber and in which the flue gases flow countercurrent to the agglomerates, to substantially continuously, in a single processing operation, dry and preheat them.

This drying and preheating of agglomerates at times may generate high particulate emissions in the flue gases exhausting from the chamber. These emissions primarily are due to agglomerate spalling in the drying zone of the chamber or high superficial gas velocity through the chamber causing abrasion of the agglomerates.

DISCLOSURE OF INVENTION

According to this invention, I have provided a means for reducing the particulate emissions in the exhaust gas stream from a glass melting furnace. The exhaust gas stream first is passed through a vertical bed preheat hopper and then through an electrified filter bed. In the hopper the furnace exhaust gases are moving in direct contact with and countercurrently to a vertical bed of glass batch agglomerates. After passing through the preheat hopper, the exhaust gas stream is electrically charged before passing through the electrified filter bed. The granules of the filter bed become coated with the charged particulate of the gas stream. The clean exhaust gases are vented to the atmosphere. The glass batch particulate then is removed from the granules and the clean granules can be recycled to the filter bed.

BEST MODE OF CARRYING OUT INVENTION

My invention includes durable granules formed of glass batch agglomerates, glass, ceramic, steel, stainless steel, aluminum, gravel or the like.

Generally, this invention is employed in a glass melting furnace from which molten glass issues. A shaft type preheater maintains a vertical bed of agglomerates, with the preheater preferably containing an upper substantially cylindrical portion and a lower inverted frusto-conical portion. Hot exhaust gases are conveyed to a lower portion of the preheater and passed countercurrently to the gravitationally downwardly flow of the agglomerates therein so as to preheat the agglomerates to an elevated temperature. The heated agglomerates are discharged from the lower portion of the preheater and without significant cooling, are directy transmitted to a glass melting furnace. In some instances, the agglomerates may have to be dried before entering the shaft type preheater.

Figure 1:
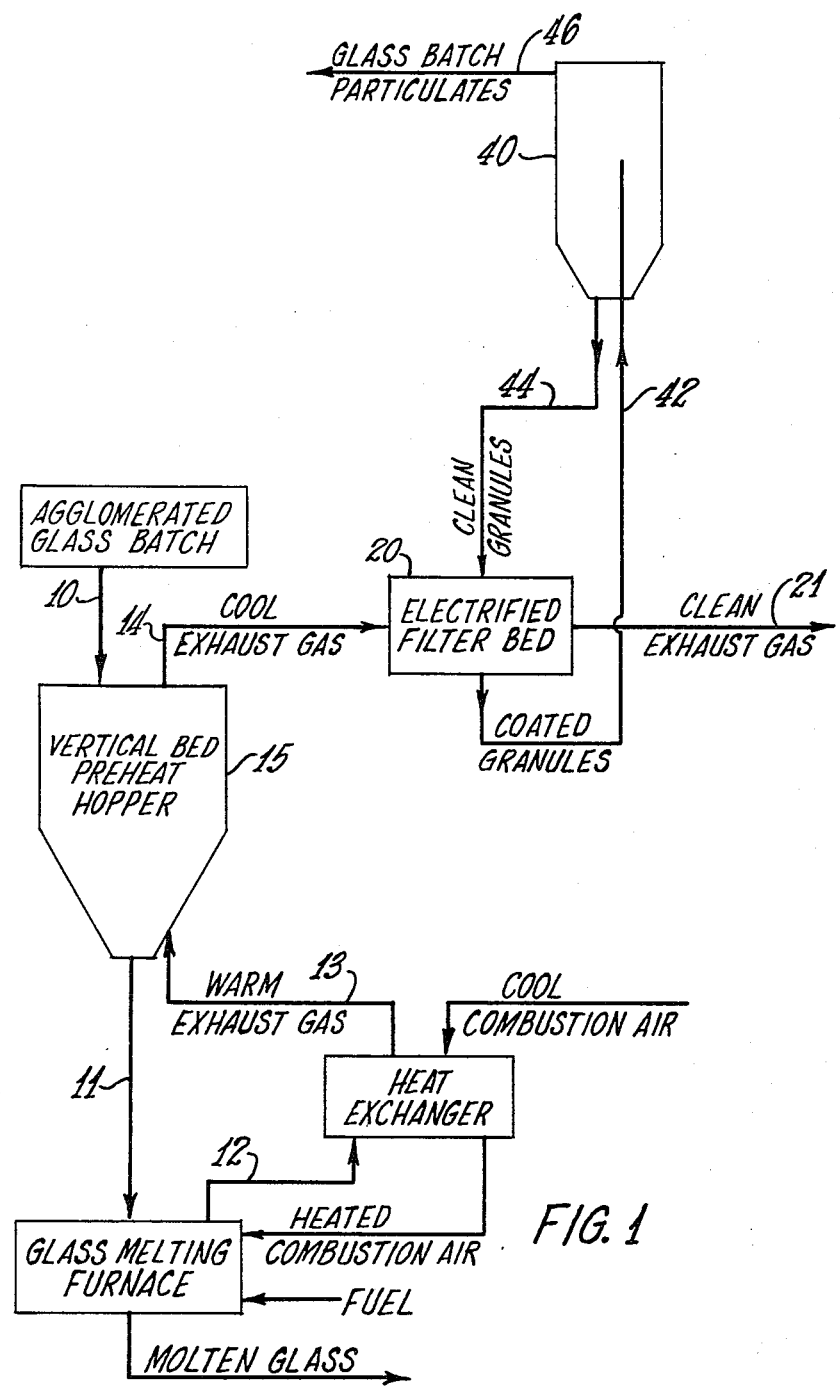
FIG. 1 is a flow diagram of the electrified filter bed of this invention in connection with a conventional glass melting furnace and shaft type heater or hopper.

In FIG. 1, agglomerated glass batch 10 is continuously fed countercurrently to the flow of warm exhaust gas 13 in preheat hopper 15. Heated agglomerates 11 then are discharged to a glass melting furnace. Hot exhaust gas 12 from the glass melting furnace is passed through a heat exchanger prior to entering the preheat hopper. Cool exhaust gas 14 leaving preheat hopper 15 is passed through electrified filter bed 20 and clean exhaust gas 21 is vented to the atmosphere.

Figure 2:
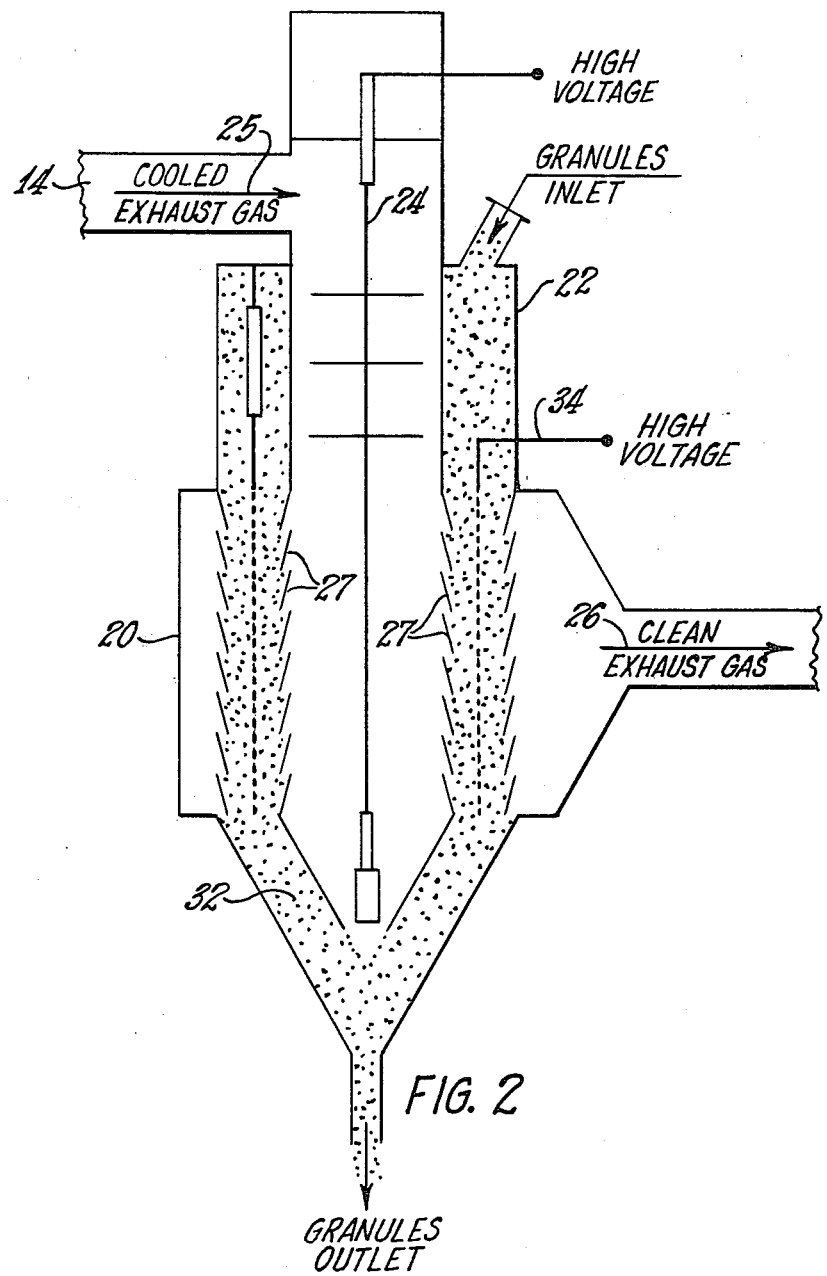
FIG. 2 illustrates the electrified filter bed of this invention in more detail.

In FIG. 2, the flow of exhaust gas 14 through filter bed 20 is shown in greater detail. The basic filter unit of the invention comprises filter 22 and electrical charger 24. Filter 22 is arranged so as to intersect a gas flow path between cooled exhaust gas inlet 25 and clean gas outlet 26. Flow directing baffles 27 are employed in filter 22. A conventional blower or fan (not shown) may be employed to push or pull the gas stream to filter bed 20.

Filter 20 is packed with filter bed medium 32. Filter bed medium 32 generally is a bed of granules such as crushed slate. The granules are fed to filter 20 from hopper 40. A high voltage supply 34 provides a uniform electric field to the bed.

A suitable electrical charger 24 also is provided. Particulate entrained in exhaust gas 25 is electrically charged when they pass through the region containing electrical charger 24. The electric field formed by high voltage source 34 effectively polarizes the bed granules of filter 22, producing caps of positive and negative charges on each granule. The charge caps then act as collection sites for previously charged particulate in exhaust gas stream 25.

In one embodiment, this invention can be employed in making fiberizable glass compositions. Fiberizable glass compositions such as E glass typically include boron and fluorine containing compounds as fluxing agents which reduce the viscosity of the glass, particularly during the early stages of melting. The composition of E glass is disclosed in U.S. Pat. No. 2,334,961 issued on Nov. 23, 1943. In the past, E glass, which is the most common glass composition used for making textile fibers, typically had 9 to 11 weight percent of $B_2O_3$. More recently, E glass compositions have contained only 6 to 9 weight percent $B_2O_3$.

The following example is the glass currently used in making fine filament E glass fibers.

| Ingredient | Weight Percent |
| --- | --- |
| $SiO_2$ | 54.3 |
| $Al_2O_3$ | 14.6 |
| CaO | 21.2 |
| MgO | 0.5 |
| $B_2O_3$ | 7.3 |
| $Na_2O$ | 0.4 |
| $K_2O$ | 0.1 |
| $TiO_2$ | 0.6 |
| $Fe_2O_3$ | 0.2 |
| SrO | 0.3 |
| $SO_3$ | 0.01 |
| $F_2$ | 0.7 |
| T (°F.) at log viscosity = 2.5 | 2345 |
| Liquidus T (°F.) | 1954 |

In another embodiment, the batch materials employed in this invention predominantly are finer than 150 mesh.

In still another embodiment, the granules of this invention may be limestone ($CaCO_3$) or calcium oxide (CaO). These materials will react with the volatiles such as boron and fluorine in the exhaust gas stream. The resulting solid particulate reaction products, e.g., calcium borates, will become charged and removed by collection on the polarized granules. The volatiles, in the absence of the limestone or CaO, normally would pass through the electrified filter bed and condense upon entering the atmosphere causing an opacity problem. The use of limestone or calcium oxide granules may aid in controlling any potential opacity problems in the clean exhaust gases vented to the atmosphere via stream 21.

INDUSTRIAL APPLICABILITY

In operation, the granules of filter bed 22 become coated with collected particulate. When the desired amount of coating has taken place, the spent bed granules are removed, and fresh granules are introduced. The coated granules are removed to hopper 40 where the glass batch particulate is removed from the granules. In one embodiment, the granules may be recycled back to filter bed 20 for reuse. The glass batch paticulate is collected and may be charged directly to a glass melting furnace.

In one embodiment, the coated granules from filter bed 20 are conveyed to hopper 40 via stream 42 and pneumatically discharged to the interior of hopper 40. The interior of hopper 40 is an expansion chamber where the glass batch particulate and granules separate. The clean granules settle to the bottom of hopper 40 and are recycled to filter bed 20 for reuse via stream 44. The glass batch particulate is drawn off the top of hopper 40 via stream 46 with the aid of a fan or blower (not shown) and collected.

The batch ingredients can be melted in a typical gas-fired melting furnace. The melt is formed into multiple streams of glass which are attenuated into individual fibers. These fibers are gathered together into a strand which is wound upon a collet winder.

Various treatments may be applied to the fibers as they are produced. Conventional roll or pad applicators apply aqueous or organic solvent base treatments to the fibers as they are formed to enhance the temperature resistance and resistance to corrosive attack. Solutions, either aqueous or organic solvent, of metallic salts of chromium, zirconium, titanium, aluminum or others, of various inorganic or organic compounds, of monomers or polymers or mixtures of monomers and polymers of the same or different monomers, or dispersion or emulsions of various film formers, lubricants, or other size ingredients or mixtures of these may be used to treat fibers produced from the compositions of this invention to enhance their inherently excellent physical properties.

The size composition applied at forming can be an epoxy compatible size, an organo-silane size, a chrome-complex size or any of the many size compositions which provide mechanical or chemical coupling of the glass surfaces of the resin surfaces.

Continuous filaments of the glass composition can be gathered into a many-filament strand, e.g., 204, after they are treated with a size composition. A number of these strands are gathered together into a roving suitable for use as a reinforcement for a plastic structure.

I claim:

1. A process for producing glass by charging to a melting furnace and melting therein a boron or fluorine containing batch comprising the steps of agglomerating the batch using a liquid, charging the wet agglomerates onto the upper surface of a vertical bed preheat hopper having a lower discharge end communicating with the furnace, substantially simultaneously (1) withdrawing agglomerates through said lower discharge end for charging to the furnace, (2) moving the remaining agglomerates by gravity downwardly through the bed, (3) passing the hot furnace exhaust gas upwardly through the bed to heat the agglomerates therein, (4) drying the wet agglomerates on the upper surface of the bed with spent exhaust gas which has already passed through the bed, (5) electrically charging the spent exhaust gases which have passed through the bed wherein the spent exhaust gases contain glass batch particulate which are charged when step (5) is carried out, and (6) passing the charged exhaust gases through an electrified bed of granules wherein the charged glass batch particulate is removed from the spent exhaust gases by collecting on the charged granules when step (6) is carried out and wherein the granules are limestone or calcium oxide.

2. A process according to claim 1 wherein the melted glass batch is formed into multiple streams of glass which are attenuated into individual fibers.

3. A process according to claim 1 wherein the fibers are gathered together into a strand.

4. A process according to claim 1 wherein the batch has a particle size finer than 150 mesh.

* * * * *